United States Patent [19]

Albanese

[11] Patent Number: 4,496,525
[45] Date of Patent: Jan. 29, 1985

[54] METHOD FOR USING CHEMICAL ADDITIVES TO PROTECT UTILITY BOILER AIR HEATERS WHILE INCREASING UNIT GENERATION CAPACITY

[75] Inventor: Vincent M. Albanese, Lisle, Ill.

[73] Assignee: Nalco Chemical Company, Oak Brook, Ill.

[21] Appl. No.: 517,111

[22] Filed: Jul. 25, 1983

[51] Int. Cl.$^3$ ............................................. C01B 17/00
[52] U.S. Cl. ...................................... 423/242; 55/73; 110/343; 110/345
[58] Field of Search ....................... 423/242 A, 242 R; 55/73; 110/343, 345

[56] References Cited

U.S. PATENT DOCUMENTS 4,100,258  7/1978  Vossos et al.
4,298,497  11/1981 Columbo .......................... 423/242 X
4,444,128  4/1984  Monro .................................. 110/345

OTHER PUBLICATIONS

Bienstock, D. et al., "Process Development in Removing Sulfur Dioxide from Hot Flue Gases," Bureau of Mines Report of Investigations 5735, U.S. Dept. of the Interior, 1961.

Primary Examiner—Gregory A. Heller
Attorney, Agent, or Firm—John G. Premo; Robert A. Miller; Donald G. Epple

[57]         ABSTRACT

A method of improving the efficiency of large industrial boilers of the type using heat exchangers heated by superheated steam diverted from the steam used to produce energy, which heat exchangers elevate the temperature of the air heater section of such boilers to minimize corrosion caused by the condensation of $SO_3$ to produce sulfuric acid which comprises reducing the temperature of the air heater by throttling the steam fed the heat exchanger while, at the same time, using an amount of sulfuric acid neutralizing chemical in the air heater section of such boilers to neutralize any increase in the sulfuric acid formed.

3 Claims, 1 Drawing Figure

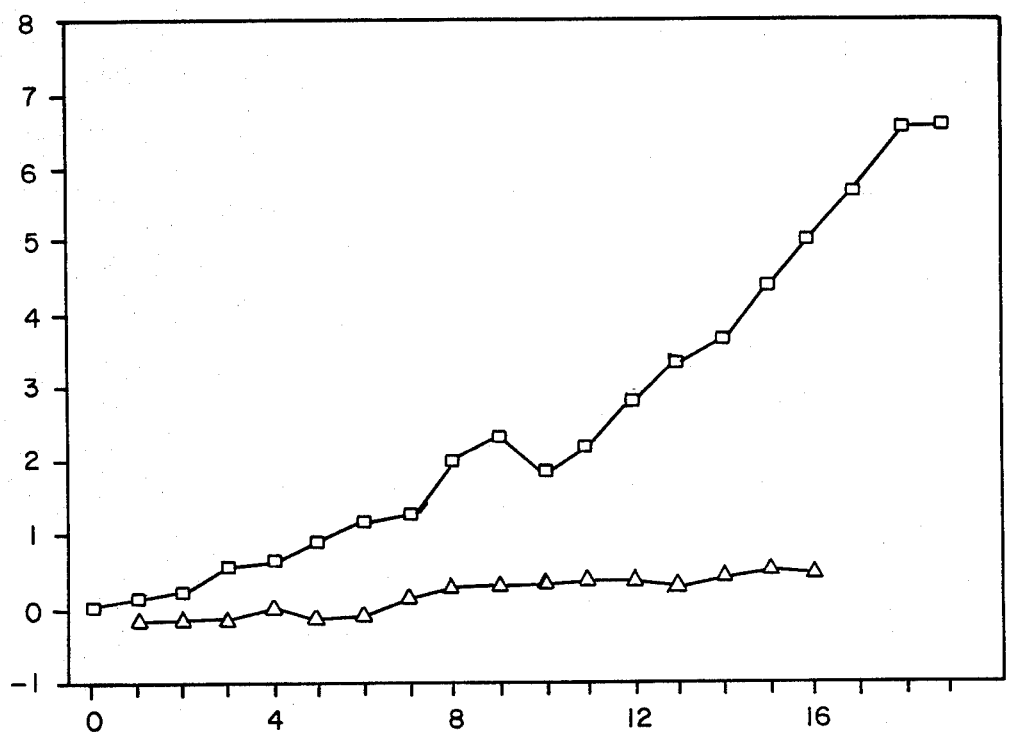

METHOD FOR USING CHEMICAL ADDITIVES TO PROTECT UTILITY BOILER AIR HEATERS WHILE INCREASING UNIT GENERATION CAPACITY

INTRODUCTION

Large electric utility boilers that fire sulfur bearing fuels are often concerned with corrosion which results from trace levels of sulfuric acid vapor condensing from the flue gas. Trace levels of acid, 1–50 ppm by volume, can condense on metal surfaces in fireside temperature zones approaching the acid dew point. The amount of condensation, and therefore potential for corrosion damage, increases with increasing concentrations of sulfuric acid vapor in the gas. The amount of condensation also increases with decreasing gas temperature below the acid dew point.

The air heater of an electric utility boiler is the most vulnerable heat transfer surface for corrosion caused by dew point condensation of flue gas acid. Propensity for corrosion is often monitored by calculating the cold end average temperature. This temperature is the average temperature of the flue gas exiting the air heater and the combustion air entering the air heater.

Typically, artificial means are used to pre-warm the air heater to minimize the propensity for acid condensation. A heat exchanger is often used for his purpose. The heat source for the heat exchanger is usually superheated steam from one of the intermediate pressure turbine stages. Utilization of these systems may increase the cold end average temperature by 30°–50° F., thus decreasing the tendency for acid condensation and its attendant corrosion.

However, this also decreased the steam generating efficiency of the unit because of flue gas exiting the air heater and stack becomes warmer in accordance with the amount of heat provided by the heat exchanger.

Despite the foregoing system being utilized, many utility boilers firing coal having a sulfur content greater than 2.5%, or oil having sulfur exceeding 1.5%, have problems caused by acid condensation. The mechanical method of heat exchanging steam heat with combustion air merely allows such units to be operated at all. To abate acidic corrosion or air heater plugging caused by acid condensation in these units, chemical additives have been applied to neutralize the acid.

THE INVENTION

A method of improving the efficiency of large industrial boilers of the type using heat exchangers heated by superheated steam diverted from the steam used to produce energy, which heat exchangers elevate the temperature of the air heater section of such boilers to minimize corrosion caused by the condensation of $SO_3$ to produce sulfuric acid which comprises reducing the temperature of the air heater by throttling the steam fed the heat exchanger while, at the same time, using an amount of sulfuric acid neutralizing chemical in the air heater section of such boilers to neutralize any increase in the sulfuric acid formed.

This invention teaches the use of a chemical additive program which not only mitigates the effects of acid in the air heater, but allows one to do so while minimizing the employment of the combustion air preheat system. The chemical additives used in the practice of the invention may be selected from any number of materials that have been suggested for the purpose of reducing corrosion of the type described. Several such treatments are set forth in Column 1 of U.S. Pat. No. 4,100,258, the disclosure of which is incorporated herein by reference. Thus, many alkaline materials such as chromia or alumina may be used. See, also, the publication entitled, "Process Development in Removing Sulfur Dioxide from Hot Flue Gases, by D. Bienstock, J. H. Field, and J. G. Myers, *Bureau of Mines Report of Investigations* 5735, United States Department of the Interior, U.S. Bureau of Mines, 1961.

A particularly useful material is a liquid form of sodium aluminate described in this patent as follows:

| Color | Water White to Straw |
|---|---|
| $Na_2O/Al_2O_3$ Ratio | 1.5/1.0 |
| Specific Gravity at 100° F. | 1.450–1.460 |
| $Al_2O_3$ | 19.9% |
| $Na_2O$ | 18.3% |
| Pour Point | Approx. −20° F. |
| pH of 5% Sol | 12.7 |
| Viscosity | |
| 0° F. | 14,000 cps |
| 20° F. | 2,000 cps |
| 40° F. | 280 cps |

A preferred material for use in the practice of the present invention is a calcium bentonite clay which has been coated with approximately 30% by weight of the No. 2 liquid sodium aluminate described above. This material is most beneficial when used in accordance with the teachings herein.

The added level of protection against acid condensation allows decreases in stack gas temperature with minimal manifestation of acid condensation. By throttling the steam valve to the combustion air heat exchanger, less sensible heat is emitted from the stack. Thus, the unit efficiency is increased. Of greater importance is the option to fire at full capacity and, at throttled combustion air preheat, to operate the system at higher generation capacity then otherwise attainable. Greater generation is obtained because the extraction steam utilized to pre-warm the combustion air is expanded through the turbine generator.

EXAMPLE

To demonstrate the invention, data was obtained from a cyclone fired 320 MW unit burning high sulfur coal. This unit utilized a tubular two-gas-pass air heater which operates at a cold end average temperature of 250° F. The 250° F. cold end average was maintained by utilizing four glycol heaters in the combustion air supply system. Extraction steam from the intermediate pressure turbine heats the glycol. The rate of extraction is 40,000 lbs/hr to maintain the 250° F. cold end average during the winter.

Under these conditions, the air heater pressure differential increases. In accordance with the drawing, the numbers appearing along the vertical axis of the drawing represent inches of draft loss with the steam valves wide open. The numerals under the horizontal axis represent weeks. The upper curve on the drawing, represented by squares, represents a typical operation of the system during a winter without using the invention. The lower curve, represented by triangles, represents the improvement achieved using the practices of the invention during a similar winter season. That is, 0 inches water column pressure increment upon startup for the winter duty cycle increases to 6.5–7.0 inches water column pressure increment. During the same months, the following season control of air heater pluggage was undertaken by addition of the sodium aluminate solution coated clay previously described. Results are shown in the lower function in the drawing. The increment in draft loss or air heater differential was maintained at 0.5 inches water column pressure or less at VWO* load for the 16 week season.

*VWO=steam valves wide open

Cold end average temperature was 250° F. under both sets of conditions. Usage of chemical under VWO steam load was 103 lbs/hr on average (0.8 lb. chemical/ton coal fired). Unit capacity at VWO steam load was 337 MW.

Operation of the glycol heaters was subsequently throttled under VWO conditions. This activity resulted in a cold end average temperature of 225° F. Stack gas temperature dropped by 15° F. This resulted in an increase in electrical generation capacity of 1.5 MW.

At cold end average temperatures, the tendency of flue gas $SO_3$ to condense in the air heater causing corrosion is increased.

Increasing the chemical powder application rate by 10 lb/hr maintained the air heater differential at 0 inches water column pressure increment. Thus, for a minor potential increase in application cost to protect the air heater (e.g. $3.00/hr.), additional power can be made at a premium of around $15/hr. This is realized by assuming a $10/MW-hr difference power cost multiplied by the generation increment of the unit. Thus, each MW of electrical generation allowed on the unit is one less MW that needs to be generated on a costlier unit.

Having thus described my invention, I claim:

1. A method of improving the efficiency of large industrial boilers of the type using heat exchangers heated by superheated steam diverted from the steam used to produce energy, which heat exchangers elevate the temperature of the air heater section of such boilers to minimize corrosion caused by the condensation of $SO_3$ to produce sulfuric acid which comprises ratioing an effective amount of a sulfuric acid neutralizing chemical into the air heater section of such boilers to neutralize increases in sulfuric acid formed due to the reduction of air temperatures caused by throttling the steam fed to said heat exchangers.

2. The method of claim 1 where the neutralizing chemical is an aqueous solution of sodium aluminate.

3. The method of claim 1 where the neutralizing chemical is an aqueous solution of sodium aluminate coated on clay.

* * * * *